Patented Apr. 21, 1953

2,636,045

UNITED STATES PATENT OFFICE 2,636,045

DIURETIC MERCURY COMPOUNDS

Alfred Halpern, Brooklyn, N. Y., assignor to E. Fougera & Co., Inc., New York, N. Y., a corporation of New York No Drawing. Original application November 30, 1949, Serial No. 130,363, now Patent No. 2,592,418, dated April 8, 1952. Divided and this application December 28, 1951, Serial No. 264,005

6 Claims. (Cl. 260—431)

This invention relates to new therapeutically active organic mercurial compounds and has particular relation to organic mercurial compounds distinguished by diuretic activity and relatively low toxicity. The invention also relates to the methods of preparing these new compounds.

The known organic mercurial diuretics possess a common relationship, in which the mercury is bound to a carbon atom of an aliphatic lateral chain and they also possess a solubilizing carboxyl group.

The main object of this invention is to provide new mercury compounds by the introduction of mercury into new organic compounds which contain at least one unsaturated group, consist of an alkyl group, a ureido or guanido group and a carboxyl group and have the general formula

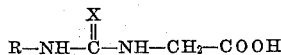

R—NH—C—NH—CH$_2$—COOH wherein R stands for allyl or butenyl and X stands for O or NH.

Another object of the present invention is to provide said new organic compound by the reaction of glycine (amidoacetic acid) with suitable organic reactants.

It is also an object of this invention to convert the above mentioned new mercury compounds into theophylline, theobromine or sodium succinimide derivative and to solubilize the compounds embodying the invention by forming their salts with an alkali metal having an atomic weight below 56.

Other objects of the invention will be apparent from the appended claims and the following specification which describes by way of example some preferred embodiments of the invention.

The above mentioned new organic compounds can be prepared according to the following reactions:

(I)
R.NC=O + NH$_2$CH$_2$COOH ⟶ R.NH.C—NH.CH$_2$COOH
‖
O (II)
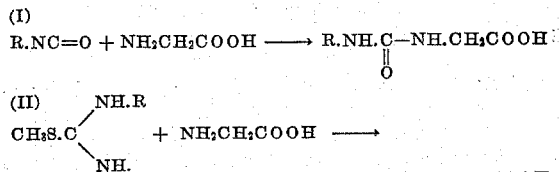

R.NHC(:NH)NH.CH$_2$COOH wherein R stands for allyl or butenyl. In order to convert the compounds thus obtained into mercuated derivatives suitable for use as a diuretic, said compound is reacted in an aqueous or alcoholic medium with a mercury salt of the formula Z—Hg—Z or Z—Hg—W, either as such or freshly formed, Z meaning a group capable of forming a metal salt, such as acetoxy or chloride group and W an alkoxy or hydroxy group. The general formula of the mercurated product is probably

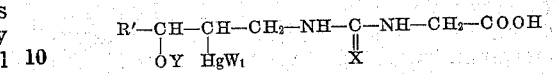

wherein R' stands for H or CH$_3$; Y stands for H, methyl, ethyl, propyl or isopropyl; W$_1$ stands for acetoxy, chloro or hydroxy and X stands for O or NH.

Furthermore, these mercuated compounds may be caused to react with a weakly acid nitrogen containing heterocyclic compound, such as a di-substituted xanthine, for example theophylline, theobromine and succinimide to form compounds of the probable formula shown further below.

The compounds prepared according to the invention may be solubilized by forming their salt of a metal having an atomic weight below 56, such as sodium, potassium, calcium or magnesium or by treatment with ammonium hydroxide, so that they can be administered in dissolved condition by injection and be readily absorbed.

Example I 8.3 grams (1/10 mole) of allyl isocyanate mixed with 50 cc. of distilled water containing a small amount of potassium hydroxide or sodium hydroxide, are mixed with 5 grams (0.066 mole) of glycine in 25 cc. of water, and heated on a steam bath for about 30 minutes. The amount of alkali must be sufficient for obtaining an alkalinity of about pH 9 to 12 in the reaction medium. The mixture is then cooled in an ice bath. A white solid begins to crystallize and is filtered after standing for about two to three hours. The crystalline product thus obtained is N-allyl-hydantoic acid; it has a nitrogen content of 17.5% and melts with decomposition at 153°–156° C.

Example II 0.1 mole of the N-allyl-hydantoic acid is mixed with about 1.5 liters of hot methanol and to it is added a solution of 0.1 mole of mercuric acetate in about 100 cc. of hot methanol. The mixture is stirred and allowed to sit at room temperature for about 24–48 hours and the solvent is then evaporated under reduced pressure. The remaining white powder melts with decomposition at 178°–180° C. and shows a mercury content of 44.5%.

The chemical reactions in the above Examples I and II are as follows:

CH₂=CH—CH₂—NC=O + H₂N—CH₂COOH ⟶ allylisocyanate    glycine

CH₂=CH—CH₂NH—C—NH—CH₂COOH
      ‖
      O

N-allyl-hydantoic acid

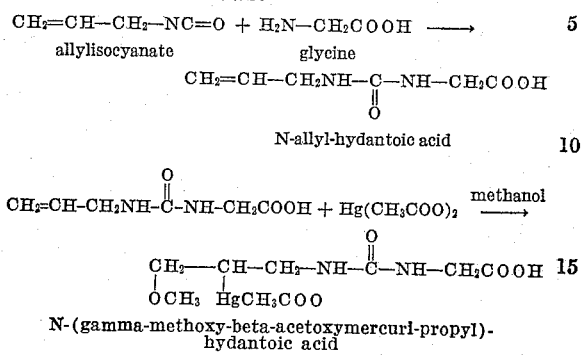

N-(gamma-methoxy-beta-acetoxymercuri-propyl)-hydantoic acid

By using ethanol, propanol, or isopropanol in place of the methanol, the appropriate analogous alkoxy derivative is obtained. These derivatives melt with decomposition at the following temperatures:

Ethoxy derivative_____ 176°–179° C.
Propoxy derivative_____ 171°–174° C.
Isopropoxy derivative_____ 169°–171° C.

If the reaction between the N-allyl-hydantoic acid and mercuric acetate is carried out in aqueous medium, instead of the alkoxy derivative the analogous hydroxy derivative is obtained.

Example III 0.14 mole of butenyl isocyanate mixed with 50 cc. of distilled water, containing a small amount of potassium hydroxide or sodium hydroxide, are mixed with 0.1 mole of glycine in 40 cc. of distilled water and heated on a steam bath for about 30 minutes. The amount of alkali must be sufficient for obtaining an alkalinity of about pH 9 to 12 in the reaction medium. The mixture is then cooled in an ice bath and is filtered after standing for about two to three hours. The product formed is N-butenyl-hydantoic acid. It contains 16.0% of nitrogen and melts with decomposition at 150°–154° C. The reaction takes place according to the following scheme:

CH₃—CH=CH—CH₂—NC=O + H₂N.CH₂.COOH ⟶
 butenyl isocyanate    glycine

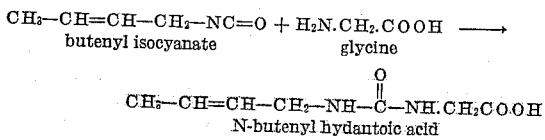

N-butenyl hydantoic acid

Example IV 0.1 mole of the N-butenyl hydantoic acid is mixed with about 1.5 liters of hot methanol and to it is added a solution of 0.1 mole of mercuric acetate in about 100 cc. of hot methanol. The mixture is stirred and allowed to sit at room temperature for about 24–28 hours. Upon evaporation of the solvent under reduced pressure, the mercurated compound is obtained as a white powder of the following probable formula:

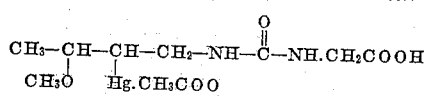

Example V 0.1 mole of S-methyl-N-allyl-thiouronium salt is mixed with about 50 cc. of 2 normal aqueous sodium hydroxide or potassium hydroxide solution and placed in an ice bath. A hot solution of 10 grams of glycine in about 50 cc. of distilled water is added rapidly and the mixture stirred. When the temperature of the mixture is about 25° C., the flask is removed from the ice bath and about 100 cc. of ether are added. After sitting at room temperature for 24 hours, the mixture is chilled for about two hours and filtered with the aid of suction. A crystalline substance is obtained, which is purified by recrystallization from hot water. This substance, which is N-allyl-guanido-acetic acid, melts with decomposition at 253°–256° C. and has a nitrogen content of 27.2%.

The reaction takes place according to the following scheme:

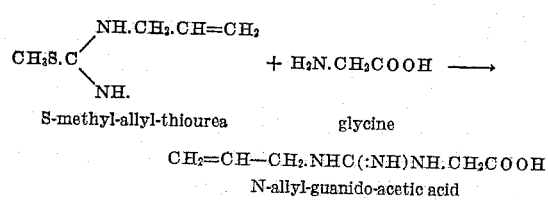

CH₂=CH—CH₂.NHC(:NH)NH.CH₂COOH

N-allyl-guanido-acetic acid

Example VI

In order to convert the N-allyl-guanido-acetic acid obtained in Example V into a mercurated compound, 0.1 mole of the latter is mixed with about 1.5 liters of hot methanol and a solution of 0.1 mole of mercuric acetate in about 100 cc. of hot methanol under stirring. The mixture is allowed to sit at room temperature for 24–48 hours and the solvent is then evaporated under reduced pressure. The mercurated compound, which is obtained as a white powder, has the following probable formula:

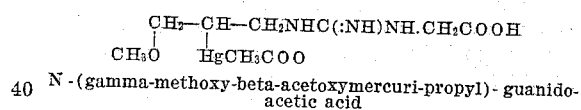

N-(gamma-methoxy-beta-acetoxymercuri-propyl)-guanido-acetic acid

This compound melts with decomposition at 185°–188° C., while the corresponding ethoxy compound, which is obtained in a similar manner with ethylalcohol, melts with decomposition at 183°–185° C.

Example VII 0.1 mole of S-methyl-N-butenyl-thiouronium salt is mixed with about 50 cc. of 2 normal aqueous sodium hydroxide or potassium hydroxide solution and placed in an ice bath. A hot solution of 10 grams of glycine in about 50 cc. of distilled water is rapidly added and the mixture stirred. When the temperature of the reaction mixture is about 25° C., the mixture is removed from the ice bath and about 100 cc. of ether are added. The mixture is kept at room temperature for 24 hours, then chilled for about two hours and then filtered under suction. The filtration residue is recrystallized from hot water. It is a compound of the formula

CH₂=CH—CH₂—CH₂NHC(:NH) NH.CH₂COOH

N-butenyl-guanido-acetic acid

Example VIII

The N-butenyl-guanido-acetic acid can be converted into a mercurated compound substantially in the same manner as the N-allyl-guanido-acetic acid in Example VI, i. e. by mixing 0.1 mole of the N-butenyl-guanido-acetic acid with about 1.5 liters of hot methanol and a solution of 0.1 mole mercuric acetate in about 100 cc. of hot methanol, keeping the mixture at room temperature for 24–48 hours and evaporating the solvent under reduced pressure. The mercurated compound has the probable formula:

$$CH_3-CH-CH-CH_2-NHC(:NH)NH.CH_2COOH$$
$$\quad\quad\;\; |\quad\;\; |$$
$$\quad\quad CH_3O\;\; HgCH_3COO$$

The modifications of the mercuration reaction described in Example II may be also applied to the mercuration of the compounds obtained according to Examples III, V and VII. Thus, ethanol, propanol, or isopropanol may be used instead of methanol under substantially equal conditions in order to obtain the appropriate analogous alkoxy derivative, and the analogous hydroxy derivative is formed if the reaction with mercuric acetate is carried out in aqueous medium.

Example IX

By using an alkoxy mercuric acetate instead of the mercuric acetate in Examples II, IV, VI and VIII, water may be substituted for one half the volume of the alcohol used as a solvent, to obtain the same products.

Furthermore, the chloromercuri derivative may be obtained when the mercurating salt contains an atom of chlorine, i. e. when for example methoxy mercury chloride is used for mercuration or when the mercurated compound is treated with a molar excess of sodium chloride solution.

Example X 0.1 mole of any of the mercurated compounds obtained according to Examples II, III, VI, VIII or IX is mixed with 0.1 mole of sodium theophylline in about 300 cc. of distilled water. The mixture is stirred for about one hour and the solvent is then evaporated under reduced pressure. The evaporation residue is washed with a small amount of warm water and the washed product is dried. The resulting white powder consists of a compound corresponding to the general formula $$R'-CH-CH-CH_2-NH-C-NH-CH_2-COOH$$
$$\quad\;\; |\quad\;\; |\quad\quad\quad\quad\;\; \|$$
$$\quad\;\; YO\;\; HgR''\quad\quad\quad X$$

wherein R' stands for H or $CH_3$; Y stands for H, methyl, ethyl, propyl or isopropyl; R'' stands for theophylline, and X stands for O or NH.

For example by reacting the N-(gamma-methoxy - beta - acetoxy - mercuri - propyl)-hydantoic acid obtained according to Example II, with theophylline, N-(gamma-methoxy-beta-theophylline-mercuri-propyl)-hydantoic acid is obtained. This derivative melts with decomposition at 176°–178° C., while the theophylline derivative obtained from the analogous ethoxy compound melts with decomposition at 173°–175° C. The theophylline derivative of the N - (gamma - methoxy - beta - acetoxymercuri-propyl)-guanido-acetic acid melts with decomposition at 181°–184° C.

By substituting in the above procedure sodium theobromine or sodium succinimide, the appropriate derivatives are formed, i. e. compounds of the above general formula, in which R'' stands for theobromine or succinimide.

Example XI 0.1 mole of the dried product obtained in one of the above Examples II, IV, VI, VIII, IX or X, is stirred with an exact equivalent solution of aqueous sodium hydroxide or alcoholic sodium methylate. The solution is then evaporated under reduced pressure and the sodium salt of the compound used as starting material is obtained. These salts are freely soluble in water.

It will be understood that the present invention is not limited to the specific substances, steps and other details described above and may be carried out with various modifications. For example, instead of glycine other compounds of the general formula $H_2N-(CH_2)_nCOOH$, wherein $n$ denotes 2, 3 or 4, can be used in order to obtain the appropriate analogous compounds embodying the present invention. These and other modifications can be made without departing from the scope of the invention as defined in the appended claims.

The compounds obtained according to the present invention are therapeutically active mercurials and are particularly distinguished by their diuretic activity and relatively low toxicity.

Reference is made to my co-pending application Ser. No. 130,363, filed November 30, 1949, of which this is a division.

What is claimed is:

1. A new compound of the general formula $$R'-CH-CH-CH_2-NH-C-NH-CH_2-COOMe$$
$$\quad\;\; |\quad\;\; |\quad\quad\quad\quad\;\; \|$$
$$\quad\;\; OY\;\; HgW_1\quad\quad\quad X$$

wherein R' is selected from the group consisting of H and $CH_3$; Y is selected from the group consisting of H, methyl, ethyl, propyl and isopropyl; $W_1$ is selected from the group consisting of acetoxy, chloro and hydroxy; X is selected from the group consisting of O and NH, and Me is selected from the group consisting of H and alkaline metal atoms with an atomic weight below 56.

2. A new compound of the formula $$CH_2-CH-CH_2-NH-C-NH-CH_2COOMe$$
$$\;\; |\quad\;\; |\quad\quad\quad\quad\;\; \|$$
$$\;\; OY\;\; HgW_1\quad\quad\quad O$$

wherein Y is selected from the group consisting of H, methyl, ethyl, propyl and isopropyl; $W_1$ is selected from the group consisting of acetoxy, chloro and hydroxy, and Me is selected from the group consisting of H and alkaline metal atoms with an atomic weight below 56.

3. A new compound of the formula $$CH_3-CH-CH-CH_2-NH-C-NH-CH_2COOMe$$
$$\quad\quad\;\; |\quad\;\; |\quad\quad\quad\quad\;\; \|$$
$$\quad\quad OY\;\; HgW_1\quad\quad\quad O$$

wherein Y is selected from the group consisting of H, methyl, ethyl, propyl and isopropyl; $W_1$ is selected from the group consisting of acetoxy, chloro and hydroxy, and Me is selected from the group consisting of H, and alkaline metal atoms with an atomic weight below 56.

4. A new compound of the formula $$CH_2-CH-CH_2NHC(:NH)NHCH_2COOMe$$
$$\;\; |\quad\;\; |$$
$$\;\; OY\;\; HgW_1$$

wherein Y is selected from the group consisting of H, methyl, ethyl, propyl and isopropyl; $W_1$ is selected from the group consisting of acetoxy, chloro and hydroxy, and Me is selected from the group consisting of H and alkaline metal atoms with an atomic weight below 56.

5. A new compound of the formula $$CH_3-CH-CH-CH_2NHC(:NH)NH.CH_2COOMe$$
$$\quad\quad\;\; |\quad\;\; |$$
$$\quad\quad OY\;\; HgW_1$$

wherein Y is selected from the group consisting of H, methyl, ethyl, propyl and isopropyl; $W_1$ is selected from the group consisting of acetoxy, chloro and hydroxy, and Me is selected from the group consisting of H and alkaline metal atoms with an atomic weight below 56.

6. A new compound of the general formula $$R'-CH-CH-CH_2-NH-C-NH(CH_2)_nCOOMe$$
$$\quad\;\; |\quad\;\; |\quad\quad\quad\quad\;\; \|$$
$$\quad\;\; OY\;\; HgW_1\quad\quad\quad X$$

wherein R' is selected from the group consisting of H and CH$_3$; Y is selected from the group consisting of H, methyl, ethyl, propyl and isopropyl; W$_1$ is selected from the group consisting of acetoxy, chloro and hydroxy; X is selected from the group consisting of O and NH, and Me is selected from the group consisting of H and alkaline metal atoms with an atomic weight below 56 and $n$ is selected from the group consisting of 2, 3 and 4.

ALFRED HALPERN.

References Cited in the file of this patent

UNITED STATES PATENTS

| Number | Name | Date |
|---|---|---|
| 2,163,296 | Tabern | June 20, 1939 |
| 2,208,941 | Geiger | July 23, 1940 |
| 2,300,992 | Tabern | Nov. 3, 1942 |
| 2,592,418 | Halpern | Apr. 8, 1952 |